United States Patent
Taira et al.

(10) Patent No.: US 9,203,210 B2
(45) Date of Patent: Dec. 1, 2015

(54) Q-SWITCHED LASER DEVICE

(71) Applicant: INTER-UNIVERSITY RESEARCH INSTITUTE CORPORATION NATIONAL INSTITUTES OF NATURAL SCIENCES, Tokyo (JP)

(72) Inventors: Takunori Taira, Okazaki (JP); Rakesh Bhandari, Okazaki (JP)

(73) Assignee: INTER-UNIVERSITY RESEARCH INSTITUTE CORPORATION NATIONAL INSTITUTES OF NATURAL SCIENCES, Tokyo (JP)

( * ) Notice: Subject to any disclaimer, the term of this patent is extended or adjusted under 35 U.S.C. 154(b) by 0 days.

(21) Appl. No.: 14/523,102

(22) Filed: Oct. 24, 2014

(65) Prior Publication Data

US 2015/0117475 A1    Apr. 30, 2015

(30) Foreign Application Priority Data

Oct. 25, 2013    (JP) ................................. 2013-222736

(51) Int. Cl.

| | |
|---|---|
| *H01S 3/11* | (2006.01) |
| *H01S 3/091* | (2006.01) |
| *H01S 3/09* | (2006.01) |
| *H01S 3/14* | (2006.01) |
| *H01S 3/16* | (2006.01) |

(52) U.S. Cl.
CPC . *H01S 3/11* (2013.01); *H01S 3/091* (2013.01); *H01S 3/1603* (2013.01); *H01S 3/1643* (2013.01); *H01S 3/09* (2013.01); *H01S 3/14* (2013.01); *H01S 3/16* (2013.01)

(58) Field of Classification Search
CPC ............. H01S 3/11; H01S 3/09; H01S 3/091; H01S 3/14; H01S 3/16; H01S 3/1603; H01S 3/1643

See application file for complete search history.

(56) References Cited

U.S. PATENT DOCUMENTS

| | | |
|---|---|---|
| 6,950,449 B2 | 9/2005 | Sakai et al. |
| 2003/0063630 A1 | 4/2003 | Sakai et al. |
| 2005/0117085 A1 | 6/2005 | Taira et al. |

FOREIGN PATENT DOCUMENTS

| | | |
|---|---|---|
| JP | A-2003-158325 | 5/2003 |
| JP | A-3585891 B2 | 11/2004 |

OTHER PUBLICATIONS

Pavel, Nicholaie et al., "High Average Power Diode End-Pumped Composit Nd:YAG Laser Passively Q-Switched by Cr4+:YAG Saturable Absorber," Japanese Journal of Applied Physics, vol. 40, pp. 1253-1259, Mar. 2001.*

(Continued)

*Primary Examiner* — Armando Rodriguez
(74) *Attorney, Agent, or Firm* — Oliff PLC (57) ABSTRACT

When an excitation light is entered in a laser medium including a doped (containing rare earth element) YAG, the vicinity of the excitation light entry face is locally heated which generates a birefringence, causing degradation of linear polarization of emitted laser. To avoid such a phenomenon, it was necessary to make the excitation light pulsed and slow down the repetition rate of the pulse. In this device, an undoped YAG is bonded to a excitation light entry face of the laser medium made of a doped YAG. By arranging the YAG <100> axis so as to extend along the optical axis of the laser oscillation system, a linearly polarized pulse laser can be obtained.

1 Claim, 6 Drawing Sheets

(56) References Cited

OTHER PUBLICATIONS

Shoji, Ichiro et al., "Intrinsic Reduction of the Depolarization Loss in Solid-State Lasers by Use of a (110)-cut Y3A15012 Crystal," Applied Physics Letters, vol. 80, No. 17, pp. 3048-3050, Apr. 29, 2002.*

Pavel, Nicholaie et al., "High Average Power Diode End-Pumped Composit Nd:YAG Laser Passively Q-Switched by $Cr^{4+}$:YAG Saturable Absorber," *Japanese Journal of Applied Physics*, vol. 40, pp. 1253-1259, Mar. 2001.

Shoji, Ichiro et al., "Intrinsic Reduction of the Depolarization Loss in Solid-State Lasers by Use of a (110)-cut $Y_3Al_5O_{12}$ Crystal," *Applied Physics Letters*, vol. 80, No. 17, pp. 3048-3050, Apr. 29, 2002.

\* cited by examiner

Q-SWITCHED LASER DEVICE

FIELD OF THE INVENTION

This specification discloses a Q-switched laser device that oscillates pulse laser when optically excited. Specifically, this specification discloses a Q-switched laser device that uses yttrium aluminum garnet crystal doped with rare earth element as a laser medium. The yttrium aluminum garnet crystal used herein is referred to as YAG.

DESCRIPTION OF THE RELATED ART

A laser device comprising an oscillation system having a doped YAG inserted therein is known. When an excitation light is introduced in the oscillation system, the oscillation system oscillates laser. The yttrium aluminum garnet crystal containing rare earth element is referred to as doped YAG. An art that oscillates pulse laser by having a Q-switch inserted in the oscillation system is also known. A Q-switched laser device that uses doped YAG as the laser medium is disclosed in "High Average Power Diode End-Pumped Composite Nd:YAG Laser Passively Q-switched by $Cr^{4+}$:YAG Saturable Absorber, Nicolaie Pavel, Jiro Saikawa, Sunao Kurimura and Takunori Taira, Jpn. J. Appl. Phys. Vol. 40 (2001) pp 1253-1259".

There is a demand for increasing pulse laser peak power. For that purpose, increasing the space density of the excitation light to be entered in the laser medium is presumed to be hopeful. That means the pulse laser peak power is expected to increase by condensing the excitation light for entry in the laser medium. In fact, the laser power for a continuous-wave laser device is increased by condensing the excitation light.

In the case of a Q-switched laser device, however, only the repetition rate rather than the peak power of the pulse laser is increased by increasing the condensation level of the excitation light. An art developed for solving such a problem was disclosed in JP-A-2003-158325 and U.S. Pat. No. 6,950,449. In this art, the density level of the excitation light is not increased but the beam diameter of the excitation light to be entered in the laser medium is expanded. That means the total population of inversion stored at an opening timing of the optical switch is increased. Specifically, the excitation light is not condensed but the beam area of the excitation light is expanded before entering in the laser medium. The expanded beam diameter increases the total population of inversion which in turn increases the output energy of the pulse laser oscillated from the Q-switched laser device, that is, the pulse laser peak power is increased.

When the excitation light is entered in the laser medium, the laser medium is heated because of quantum defect. Specifically, the laser medium is locally heated within the excitation light irradiation area and its vicinity on the excitation light entrance face. The locally heated laser medium causes: local thermal expansion on the laser medium; deformation of the excitation light entrance face; and harmful effect on the laser oscillation (hereinafter referred to as "thermal issue").

According to the art disclosed in JP-A-2003-158325 and U.S. Pat. No. 6,950,449 of expanding the beam area of the excitation light to enter in the laser medium (hereinafter referred to as "excitation volume increasing technique"), the excitation light power per unit area on the excitation light entry face of the laser medium is reduced, resulting in the reduction of the heat value per unit area of the laser medium.

The deformation on the excitation light entrance face can be suppressed by placing a transparent solid plate, against the excitation light, to be bonded onto the excitation light entrance face of the laser medium (hereinafter referred to as "end-cap technique"). The end-cap technique is also advantageous in resolving the thermal issue.

Either continuous light or pulse light can be employed as the excitation light that excites the Q-switched laser device. By employing the pulse light as the excitation light, the averaged power of excitation light over time entering in the excitation light entrance face of the laser medium is reduced, thereby suppressing the thermal issue. Meanwhile, a pulse excitation light causes an instant strong excitation which can raise the population of inversion. If an excitation is made with a pulse light of lower repetition rate, the averaged power of excitation light over time is reduced, which enhances the characteristic of the Q-switched laser device while significantly suppressing the thermal issue (hereinafter referred to as low rate excitation technique).

The art disclosed in JP2003-A-158325 and U.S. Pat. No. 6,950,449 suppresses the thermal issue by combining: the excitation volume increase technique; end-cap technique; and low rate excitation technique. The disclosure in "Intrinsic reduction of the depolarization loss in solid-state lasers by use of a (110)-cut $Y_3Al_5O_{12}$ crystal, Ichiro Shoji and Takunori Taira, Applied Physics letters. Vol. 80 Number 17, (2002) pp 3048-3050" and JP3585891 is described later.

SUMMARY OF THE INVENTION

Problem(s) to be Solved by the Invention

The art disclosed in JP2003-A-158325 and U.S. Pat. No. 6,950,449 that combines the excitation volume increase technique, end-gap technique, and low rate excitation technique is an excellent art in terms of its capability in increase of the pulse laser peak power while suppressing the thermal issue, however, the art also faces a problem in that the excitation light repetition rate has to be lowered (specifically it should be approximately at 100 Hz or less).

For example, a mass imaging device is now under development in response to a demand for measuring the distribution of substances in particles such as PM2.5. Such an analyzer requires, for example, a pulse laser having a repetition rate of approximately at 1 kHz. Since the art disclosed in JP2003-A-158325 and U.S. Pat. No. 6,950,449 employs the low rate excitation technique, the above demand cannot be met.

In the art disclosed in JP2003-A-158325 and U.S. Pat. No. 6,950,449, the excitation light repetition rate was increased up to approximately 1 kHz. After that, the excitation volume increase technique and the end-cap technique were proved to be highly effective in the elimination of the thermal issue without obvious deterioration in the pulse laser peak power even increasing the excitation light repetition rate up to approximately 1 kHz. However, a laser whose wavelength is converted by entering in a wavelength converter showed a drastic deterioration in the pulse laser peak power after the conversion. In order to oscillate the wavelength-converted pulse laser, the excitation volume increase technique, end-cap technique, and low-rate excitation technique must be used in combination, and when the low rate excitation technique was removed from the combination, the wavelength conversion efficiency was extremely deteriorated. In order to allow a Q-switched laser device using a YAG to oscillate a pulse laser for wavelength conversion, the repetition rate should be controlled to be approximately 100 Hz or less.

This specification discloses an art that oscillates pulse laser for wavelength conversion not relying on the low rate excitation technique. When the pulse laser is linearly polarized, the pulse laser peak power after wavelength conversion can be maintained at a high level. An art that oscillates pulse laser linearly polarizing directly from the YAG, not relying on the low rate excitation technique, is disclosed herein.

Means for Solving the Problem

After removing the low rate excitation technique, a certain level of pulse laser intensity was ensured, but the linear polarization level of the of pulse laser was deteriorated, and the cause of this phenomenon was studied. Since a certain level of intensity was ensured, the thermal issue was supposed to be suppressed. Even so, the cause of deterioration in linear polarization had been still unknown. As a result of the study, it was proved that the excitation volume increase technique and end-cap technique can suppress the thermal issue in the area along the optical axis of the laser medium, and ensures a certain level of pulse laser intensity even without employing the low rate excitation technique, however, it was also proved linear polarization level of laser was deteriorated because of birefringence generated by a local heating region formed in the joint surface for bonding the laser medium and the end-cap. Specifically, there generates a stress between the doped YAG and the undoped YAG because the doped YAG generates heat and expands due to the quantum defect triggered by the excitation, but the undoped YAG itself does not generate heat. If they bond more at the atomic level, the stronger stress is generated in the interface. On the other hand, if these are not closely bonded in the interface, their stresses are alleviated. In that case, however, the exhaust heat effect of the undoped YAG deteriorates.

From the above findings, such an idea was created: if a novel crystallographic axis that causes less polarization deterioration due to locally generated stresses in spite of its strong bonding is present, these issues may be resolved immediately. As a result of the study, it was found that the deterioration of the laser from the linear polarization was suppressed by arranging the YAG in the direction of a <100> axis extending along the optical axis of the laser device oscillation system. When <100> axis of YAG extends along the optical axis of the laser device oscillation system, the deterioration of the laser from the linear polarization was suppressed.

The Q-switched laser device disclosed herein includes an end-cap, laser medium, and Q-switch which are arranged on a straight line (i.e., on the optical axis of the laser device) in this order. The end-cap includes an undoped YAG while the laser medium includes a doped YAG The YAG that forms the end-cap, and the YAG that forms the laser medium are arranged in the direction of the <100> axis thereof extending along the optical axis of the laser device. The YAG that forms the end-cap and the YAG that forms the laser medium are bonded together.

Usually the YAG is arranged in the direction of the <111> axis extending along the optical axis of the laser device. Because a rod-like crystal extending along the <111> axis direction can be obtained easily since the YAG grows along the <111> axis. Also for the laser device disclosed in: "High Average Power Diode End-Pumped Composite Nd:YAG Laser Passively Q-switched by $Cr^{4+}$:YAG Saturable Absorber, Nicolaie Pavel, Jiro Saikawa, Sunao Kurimura and Takunori Taira, Jpn. J. Appl. Phys. Vol. 40 (2001) pp 1253-1259; JP2003-A-158325"; and U.S. Pat. No. 6,950,449, the YAG is arranged in the direction of the <111> axis extending along the optical axis. If the excitation light entry face of the rod-like doped YAG extending over the <111> axis direction is bonded to the undoped YAG in which the crystal axes are aligned, the thermal deformation on the excitation light entry face can be prevented by the end-cap effect. In combination with the excitation volume increase technique, a pulse laser having a high peak power can be oscillated even without using the low rate excitation technique at the same time. However, without the low rate excitation technique, the pulse laser deteriorates in the linear polarization.

On the other hand, the linear polarization can be maintained without simultaneously using the low rate excitation technique, if the YAG is arranged in the direction of the <100> axis extending along the laser device optical axis. The same can be applicable when arranging the YAG in the direction of the <110> axis extending along the laser device optical axis. According to the laser device disclosed herein, a pulse laser having a high peak power while maintaining the linear polarization can be oscillated. A laser that gains a high peak power after wavelength conversion can be obtained.

An art for arranging a YAG used for the laser medium in the direction to which the <100> axis thereof extending along the optical axis of the oscillation system is disclosed in "Intrinsic reduction of the depolarization loss in solid-state lasers by use of a (110)-cut $Y_3Al_5O_{12}$ crystal, Ichiro Shoji and Takunori Taira, Applied Physics letters. Vol. 80 Number 17, (2002) pp 3048-3050" and in JP3585891. The art relates to the oscillation of continuous wave laser in which the area along the optical axis of the YAG used as the laser medium is heated over the total length of the laser medium. It is reported that the linear polarization can be maintained by arranging the YAG in the direction to which the <100> axis extending along the optical axis, when the area along the optical axis of the laser medium is heated over the total length. In comparison with the art disclosed herein, the method for "arranging the <100> axis and the optical axis in parallel" is shared between the arts, however, the reason of the deterioration from the linear polarization is different, making the art still difficult to attain the concept disclosed in this specification. The way of dealing with a phenomenon taking place in the area extending along the optical axis of the laser medium, and the way of dealing with a phenomenon taking place in the entry face (the bonding interface between an end-cap made of undoped YAG and a laser medium made of doped YAG) of the excitation light are considered to be naturally different. The inventors of the present invention reported the "Intrinsic reduction of the depolarization loss in solid-state lasers by use of a (110)-cut Y3Al5O12 crystal, Ichiro Shoji and Takunori Taira, Applied Physics letters. Vol. 80 Number 17, (2002) pp 3048-3050" and JP3585891. However, there are differences in the entering excitation light energy level, laser medium heating level, and laser medium heating region between the continuous laser oscillation device and the pulse laser oscillation device. The continuous laser oscillation technique described in above-mentioned documents was not presumed to be applicable also in the Q-switched laser oscillation technique.

Advantage of the Invention

A laser device disclosed herein can oscillate pulse laser that provides a desirable linear polarization level and a high peak power even after wavelength conversion without employing the low rate excitation technique. Therefore, it may become possible to provide a pulse laser (a pulse laser which is high in repetition rate and that performs linear polarization) necessary for achieving a next-generation mass imaging device.

DESCRIPTION OF THE PREFERRED EMBODIMENTS

The features of Examples disclosed below are listed.
(Feature 1) A YAG containing Nd is used for the laser medium.
(Feature 2) An undoped (not containing rare earth element) YAG is used for the end-cap.
(Feature 3) A YAG containing $Cr^{4+}$ is used for the Q-switch. The Q-switch acts as a passive Q-switch for utilizing a saturable absorber.
(Feature 4) The wavelength is converted from 1,064 nm to 532 nm by LBO crystal.
(Feature 5) The wavelength is converted from 532 nm to 266 nm by BBO crystal.

Example

Figure 1:
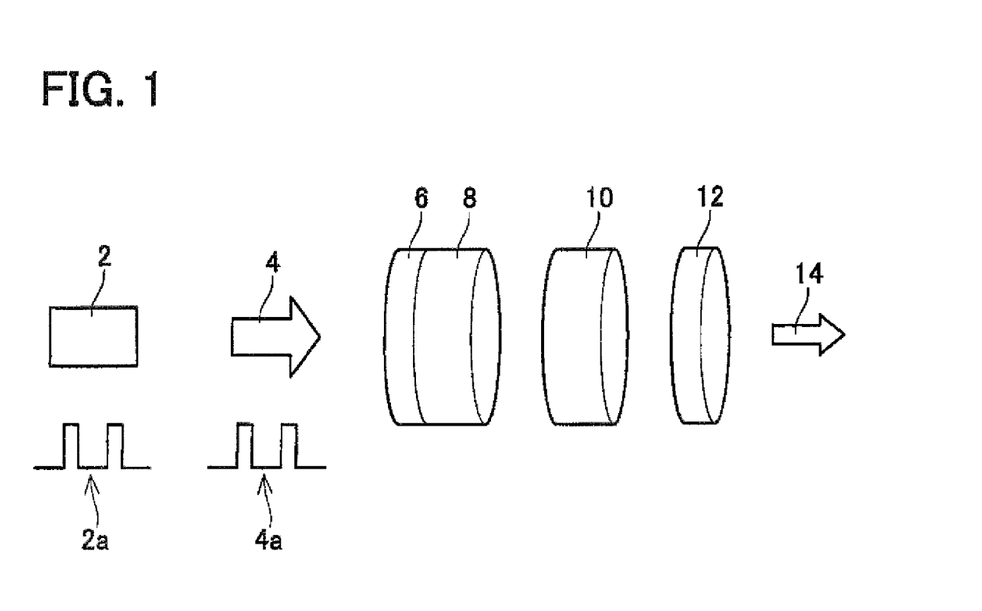
FIG. 1 schematically illustrates a Q-switched laser device structure of the example.

In FIG. 1, the reference No. 2 represents a semiconductor laser device which emits an excitation light 4. In the experiment, a pulse excitation light of reference No. 4a was gained by applying a pulse current of reference No. 2a to the semiconductor laser device 2. For the excitation light 4, the wavelength was set to 808 nm, the power to 100 W, and the pulse width to 120 µs. The repetition rate was varied in the range between 100 Hz and 1 kHz and applied in the experiment. Reference No. 6 represents an undoped (not containing rare earth element) YAG that serves as an end-cap. The YAG is formed in a disc shape with the diameter for 5 mm and thickness for 1 mm. In the YAG 6, the <100> axis faces toward the thickness direction.

Reference No. 8 represents a YAG containing 1.1 at. % of Nd and serves as a laser medium. The YAG 8 is formed in a disc shape with the diameter for 5 mm and thickness for 4 mm. In the YAG 8, the <100> axis faces toward the thickness direction.

The YAG 6 is bonded to an end face of the Nd:YAG 8 at the semiconductor laser device 2 side. The undoped YAG 6 is transparent to an excitation light 4 having a wavelength of 808 nm. The excitation light 4 is entered in the end face of the Nd:YAG 8 at the semiconductor laser device 2 side. The excitation volume increase technique is applied for the excitation light 4.

Reference No. 10 represents a $Cr^{4+}$ containing YAG with the initial transmission for 40%. The $Cr^{4+}$:YAG 10 is a saturable absorber and acts as a passive Q-switch.

Reference No. 12 represents an output coupler having a specular surface film formed thereon. The YAG 6 also includes a specular surface film formed thereon. The specular surface films of the output coupler 12 and the YAG 6 forms an oscillation system, in which an end-cap (YAG 6), laser medium (Nd:YAG 8), and passive Q-switch ($Cr^{4+}$: YAG 10) are arranged. The end-cap 6, laser medium 8, and passive Q-switch 10 are arranged on a straight line orthogonal to two specular surface films. The YAG 6 and the Nd:YAG 8 are arranged in the direction to which the <100> axis thereof extending along the straight line. For the $Cr^{4+}$:YAG 10, the relationship between the crystallographic axis and the optical axis is not specially restricted. The <111> axis may be in parallel with the optical axis and the <100> or <110> axis may be in parallel with the optical axis.

When an excitation light 4 is entered in the above-mentioned laser device, a pulse laser 14 is oscillated from an output coupler 12. The wavelength of the pulse laser 14 is 1,064 nm and the repetition rate is equivalent to that of the excitation light 4. The pulse width (half-value width) of the pulse laser 14 was 600 ps.

Figure 2:
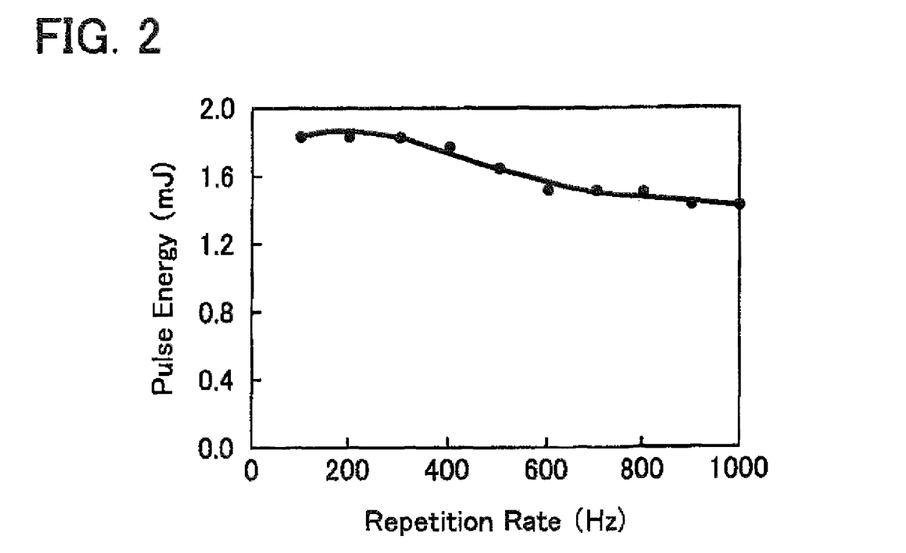
FIG. 2 illustrates the relationship between the excitation light repetition rate and the pulse laser energy.

FIG. 2 illustrates the relationship between an excitation light repetition rate (equivalent to the repetition rate of the pulse laser) and a pulse laser energy (mJ). The energy of the pulse laser is not decreased so much even by increasing the excitation light repetition rate. Even the low rate excitation technique is cancelled and an excitation is made at 1 kHZ, pulse energy of approximately 1.42 mJ (2.4 MW for the peak power) was gained.

Figure 3:
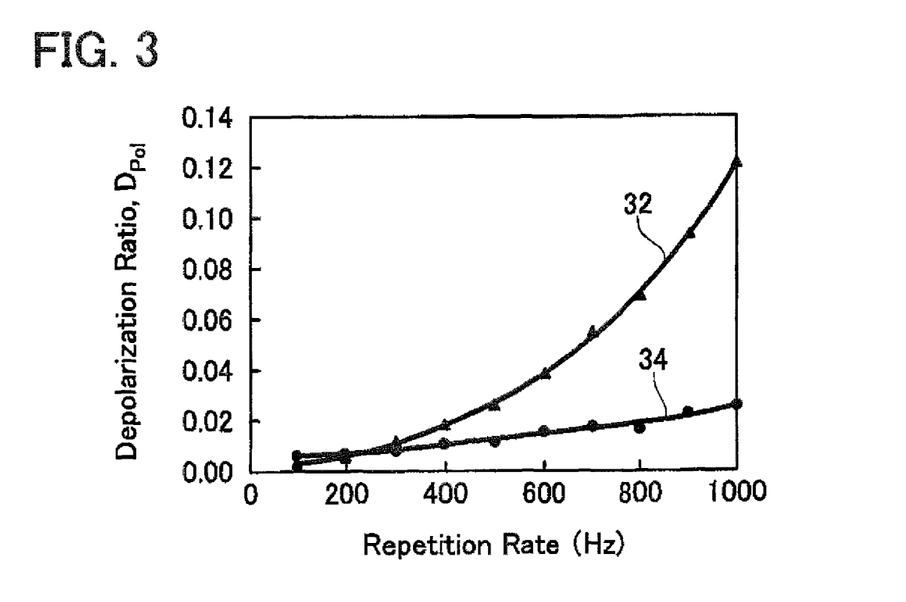
FIG. 3 illustrates the relationship between the excitation light repetition rate and the linear polarization level of the pulse laser.
Figure 4:
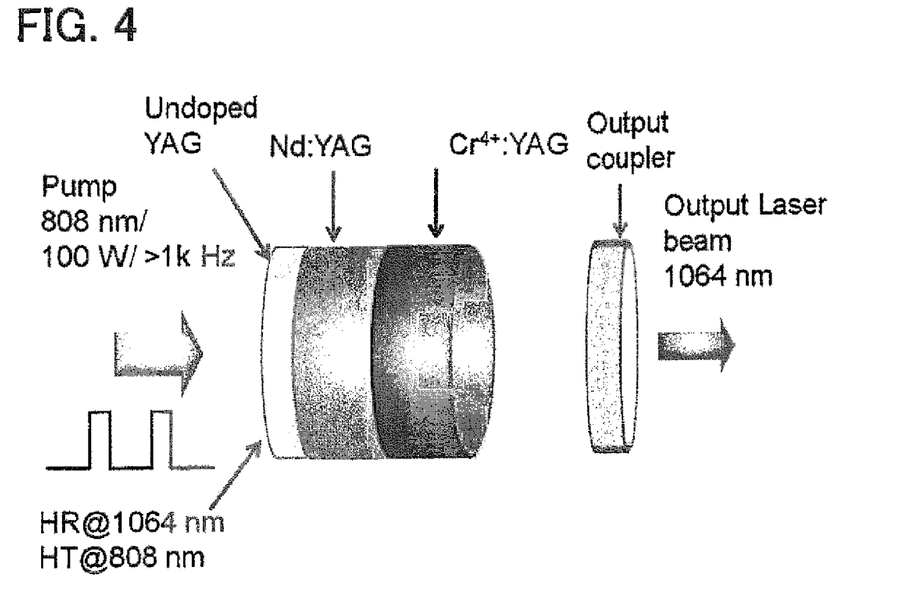
FIG. 4 schematically illustrates the Q-switched laser device structure of the other example.
Figure 5:
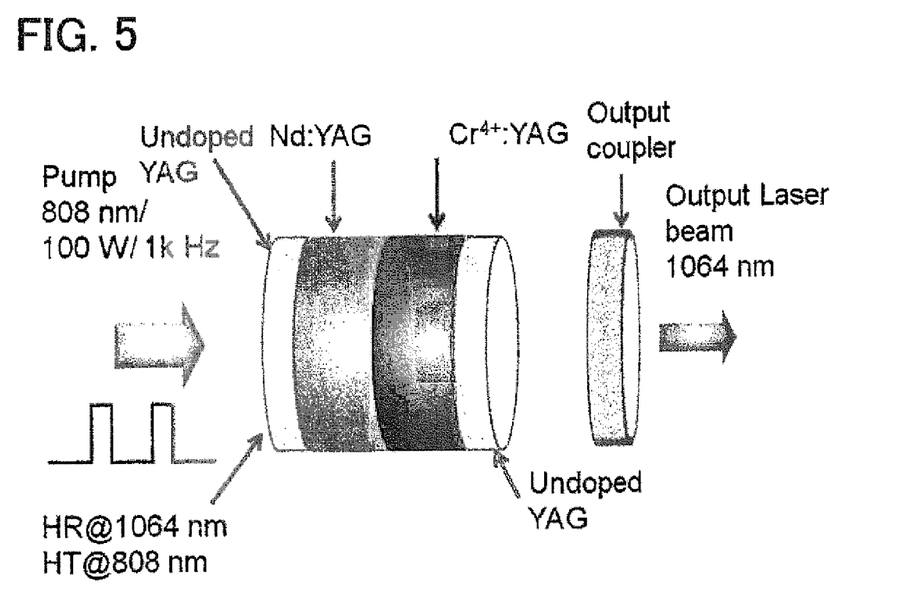
FIG. 5 schematically illustrates the Q-switched laser device structure of the other example.
Figure 6:
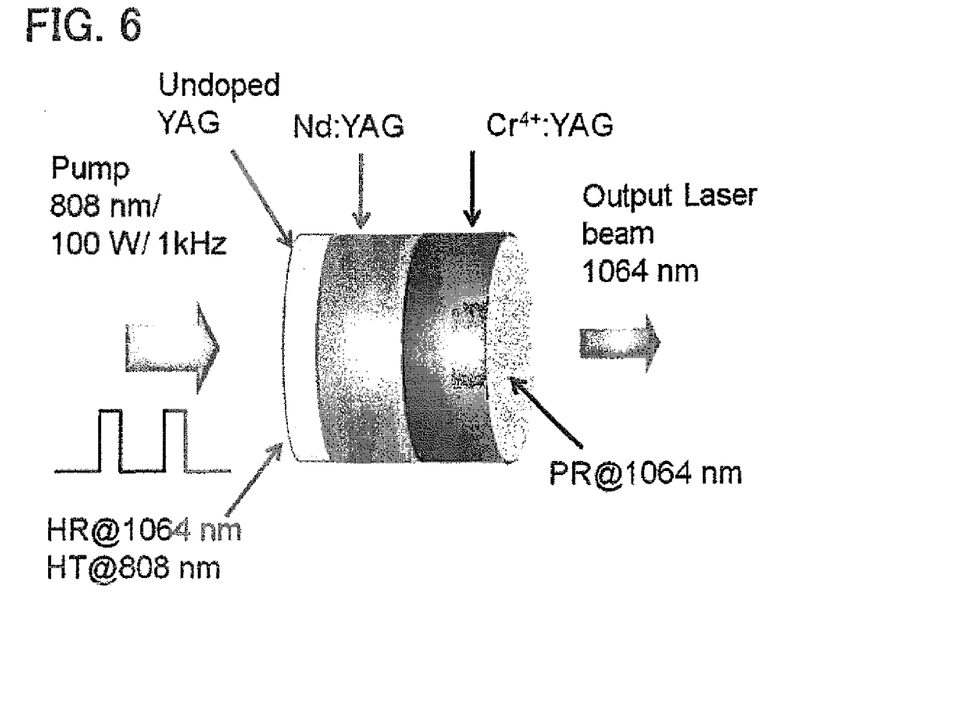
FIG. 6 schematically illustrates the Q-switched laser device structure of the other example.
Figure 7:
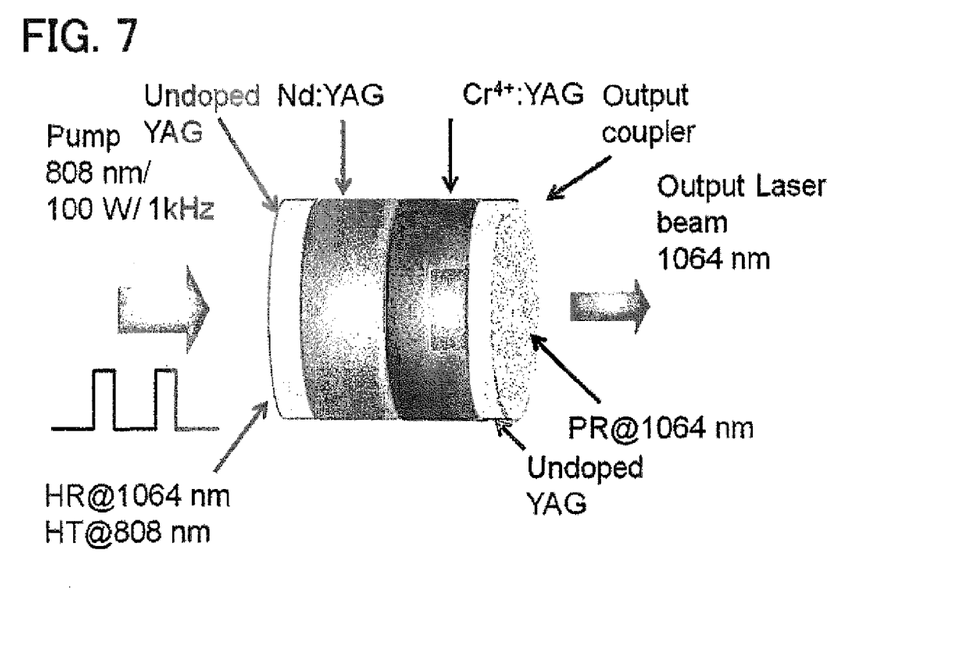
FIG. 7 schematically illustrates the Q-switched laser device structure of the other example.
Figure 8:
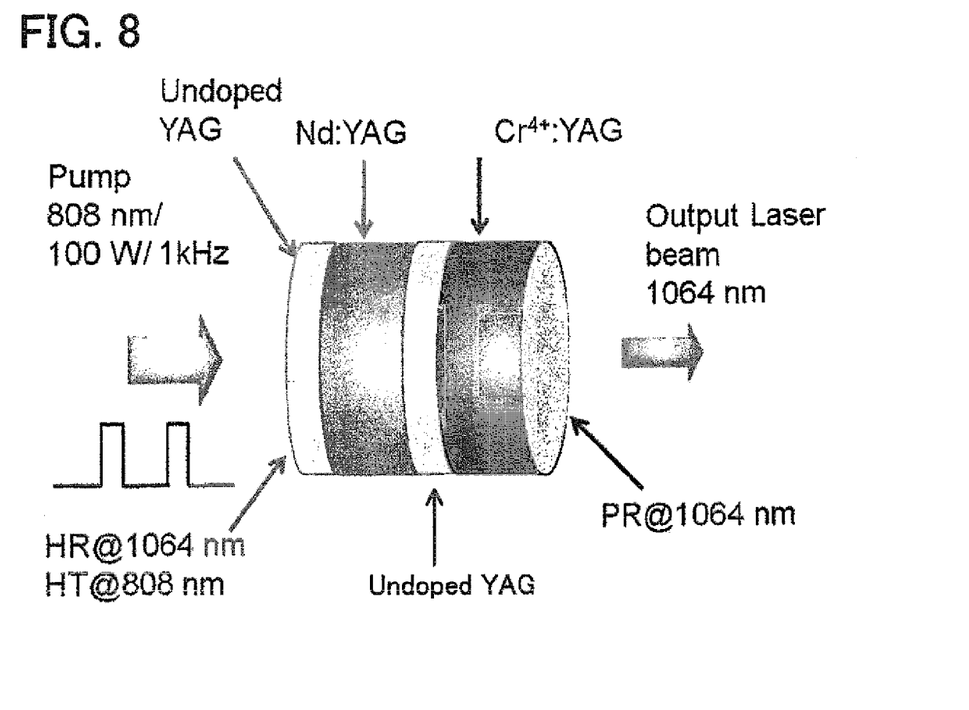
FIG. 8 schematically illustrates the Q-switched laser device structure of the other example.
Figure 9:
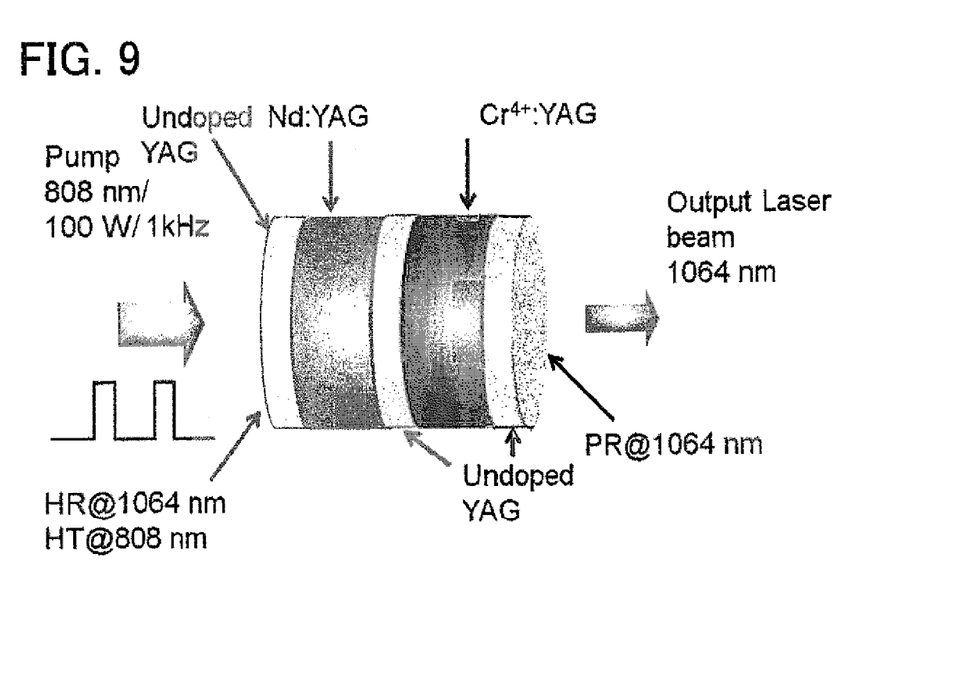
FIG. 9 schematically illustrates the Q-switched laser device structure of the other example.

FIG. 3 illustrates the relationship between an excitation light repetition rate and the linear polarization level of the pulse laser 14. The higher on the vertical axis indicates more degradation from the linear polarization. The curve 32 illustrates the relationship when the <111> axis and the optical axis are arranged in parallel with each other. It indicates that the pulse laser 14 is degraded from the linear polarization when the excitation light repetition rate is increased. On the other hand, the curve 34 illustrates the relationship when the <100> axis and the optical axis are arranged in parallel with each other. It indicates that the linear polarization of the pulse laser 14 is maintained even when the excitation light repetition rate is increased. If the <100> axis and the optical axis are arranged in parallel with each other, a pulse laser that gains a highly intensified light after wavelength conversion can be obtained. Not illustrated though, even the YAG <110> axis and the optical axis are arranged in parallel with each other, a curve similar to the curve 34 can be obtained. Even if the YAG <110> axis and the optical axis are arranged in parallel with each other, a pulse laser that gains a highly intensified light after wavelength conversion can be obtained.

Figure 10:
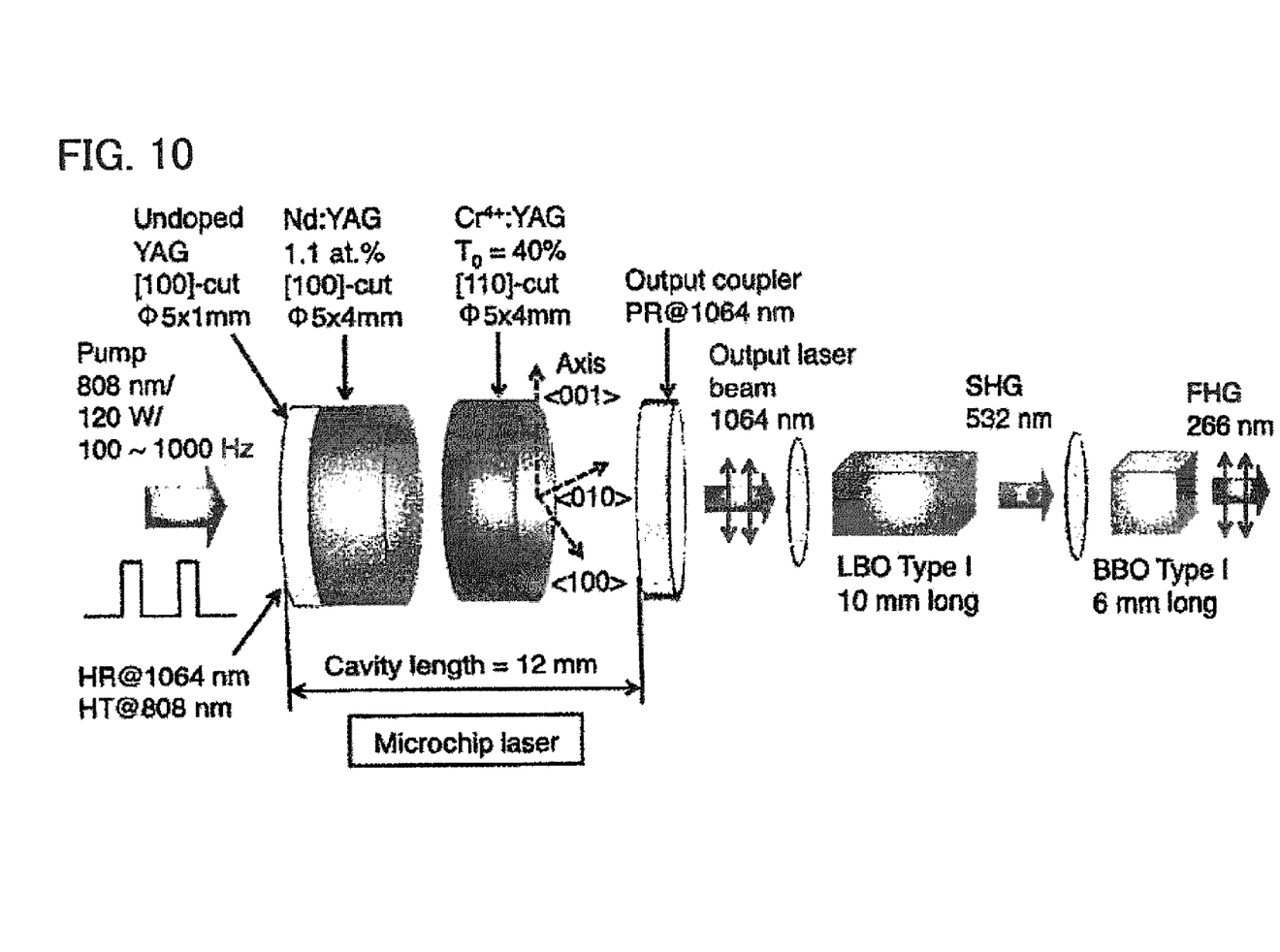
FIG. 10 schematically illustrates the Q-switched laser device structure of the other example.

FIG. 10 illustrates a device configuration in which a laser of 1,064 nm oscillated by the Q-switched laser device was converted into a laser of 532 nm by LBO crystal, and the laser of 532 nm was converted into a laser of 266 nm by BBO crystal. As shown in FIG. 3, when the YAG <100> or <110> axis is arranged in parallel with the optical axis, a high linear polarization is obtained so that a high-intensity laser after wavelength conversion is gained, for example, the peak power for the laser of 532 nm gained by LBO crystal was 1.1 MW, and the peak power for the laser of 266 nm gained by BBO crystal was 0.511 MW.

The present invention is not limited to above examples, and other variations and modifications may be made in accordance with the spirit of the present invention and should not be excluded from the scope of the present invention.

In the above-mentioned example, the end-cap, laser medium, and Q-switch are arranged in this order, they also may be arranged as: end-cap, laser medium, end-cap, Q-switch; or end-cap, laser medium, end-cap, Q-switch, and end-cap, in respective order. From FIG. 4 to FIG. 9 schematically show a Q-switched laser device structure in other example. In this example, a passive Q-switch 10 is used, however, an externally controllable Q-switch may be used. Although an Nd is used as a rare earth element to be added in the laser medium, a rare earth element other than Nd may be used.

The technology components described and illustrated herein demonstrate their technical usefulness independently or in combination which is not limited to the combination described in the claims for application. The technology components described and illustrated herein will achieve a plurality of purposes at the same time and acquire a technological usefulness by achieving one of these purposes.

What is claimed is:

1. A Q-switched laser device comprising:
an end-cap including an undoped (not containing rare earth element) yttrium aluminum garnet crystal (YAG);
a laser medium including a doped (containing rare earth element) YAG; and
a Q-switch,
wherein the end-cap, laser medium, and Q-switch are arranged on a straight line in this order, <100> or <110> axis for the undoped YAG included in the end-cap and the doped YAG included in the laser medium is extending along the straight line, the undoped YAG included in the end-cap and the doped YAG included in the laser medium are bonded together and a pulse laser is output through the Q-switch by inputting a pulse excitation light to the laser medium through the end cap.

* * * * *